INVENTORS.
Robert V. Werner
Walter J. Zable
William J. Thompson

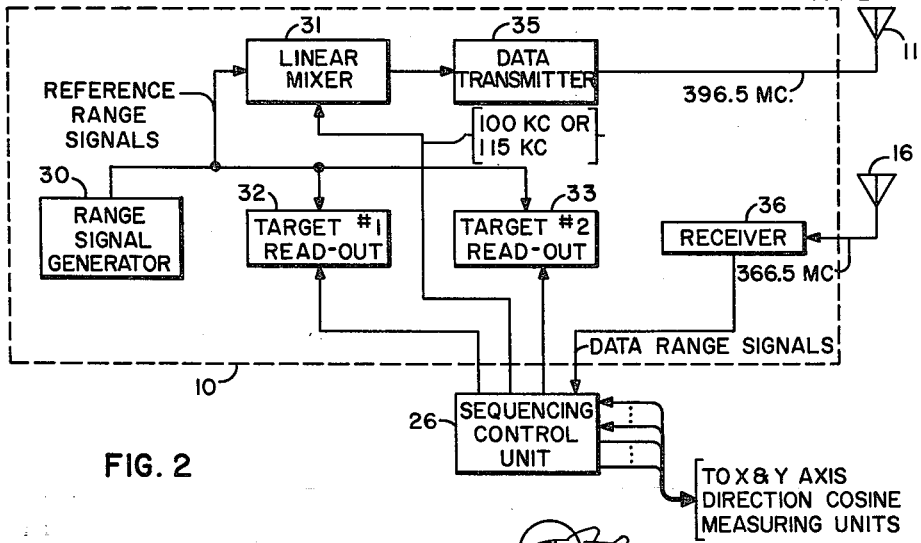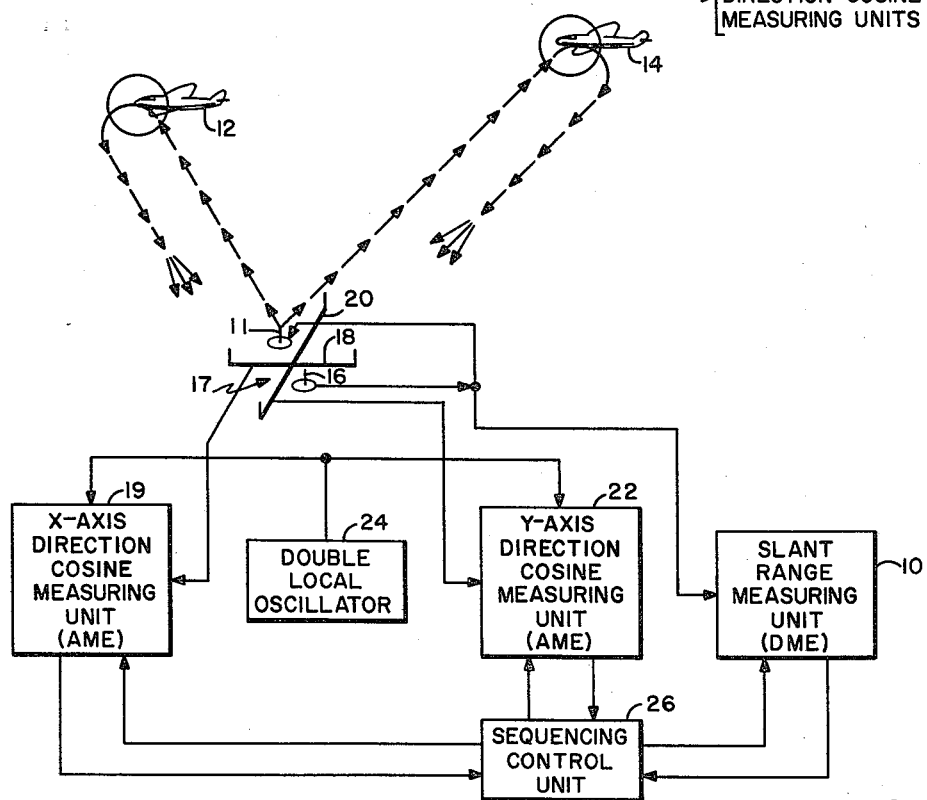

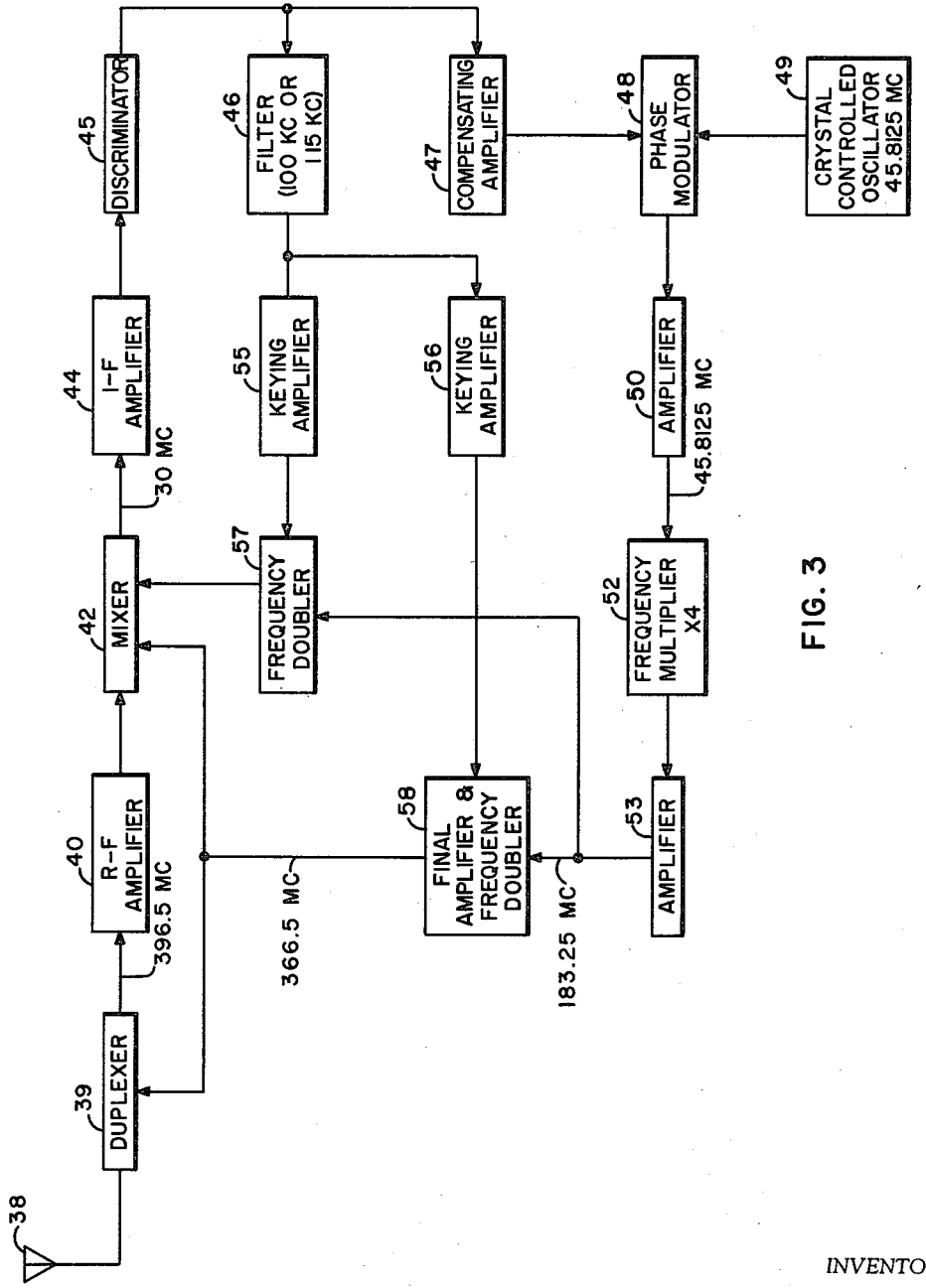

INVENTORS.
Robert V. Werner
Walter J. Zable
William J. Thompson 2,085,242
ELECTRONIC TRACKING SYSTEM
Robert V. Werner, La Mesa, and Walter J. Zable and
William J. Thompson, San Diego, Calif., assignors to
Cubic Corporation, San Diego, Calif., a corporation of
California
Filed May 12, 1960, Ser. No. 28,745
1 Claim. (Cl. 343—6.5)

The present invention relates to an electronic tracking system and, more particularly, to an electronic tracking system capable of providing simultaneous, highly-accurate tracking information of a plurality of air-borne target craft.

The tracking system, according to the present invention, is adapted to provide extremely accurate tracking information in real time of a plurality of high-speed target vehicles. Tracking information of this type is of considerable utility in a number of areas for a number of different purposes. For example, the performance, stability, maneuverability, etc, of new aircraft, missiles, rockets, etc, undergoing testing in their development phase may be derived, with the resulting information then employed for evaluation, design correction and modification purposes. Also, owing to the basic tracking accuracy of the present system and its capability of simultaneously tracking a number of target craft, the individual paths taken by an interceptor, a missile fired by the interceptor, and a target may be derived, and both scalar and vector miss-distance computed to thereby provide scoring information on the particular mission. Then, too, its application to landing systems will be apparent since the positions of a number of aircraft around the landing area may be continuously determined and displayed and detailed flight path information transmitted to each aircraft during its landing operation.

The system, according to the present invention, comprises a judicious combination of an AME, or angle-measuring equipment, of the type found described in detail in a co-pending application for patent entitled "A Multiple-Target Tracking System," Serial Number 754,099, by R. V. Werner, W. J. Zable, W. J. Thompson and A. E. Noyes, filed August 8, 1958, now U.S. Patent No. 2,976,530, and a DME or slant-range measuring equipment, of the type found described in detail in the co-pending application for patent entitled "A Sequenced Spatial Coordinate Determining System," Serial Number 737,446, by R. V. Werner, W. J. Zable and W. J. Thompson, filed May 23, 1958.

A DME system determines slant range from a ground-based antenna to a responding target vehicle, that is, it determines the target vehicle position to the extent that it lies on the surface of a hemisphere whose radius equals the slant range measurement. This is accomplished by modulating a series of so-termed range signals on a carrier signal, which is then transmitted and received by a transponder carried in the target vehicle. The transponder demodulates the range signals from the carrier signal and then remodulates them on another carrier signal, differing in frequency from the ground-received one. The ground station then receives the transponder-transmitted signal, demodulates the range signals, and employs a servo readout unit to both determine the phase shift incurred in each of the range signals and form an overall or composite phase shift representing all of the range signal, phase shifts, which, in turn, corresponds to the slant range of the transponder from the ground station.

An AME, or angle-measuring equipment, on the other hand, comprises a pair of mutually-bisecting antenna baselines, each of the baselines, in turn, including a plurality of spaced antenna pairs. A C-W signal, which, according to the present invention, comprises the transponder carrier signal, takes different path lengths to the two antennas of each antenna pair in each baseline, with the result that a phase difference exists between each of such received C-W signal pairs. This phase difference, in turn, corresponds in value to a direction cosine to the airborne vehicle measured from the particular antenna pair baseline. Since the antenna system includes two bisecting baselines, the pair of direction cosines determined by the pair of baselines, respectively, determines a unique direction vector pointing to the target craft.

As noted earlier, the present invention combines an AME and DME system to produce spatial coordinate position information of a plurality of airborne vehicles. In particular, the intersection of the hemisphere determined by the DME slant range and the unique direction vector pointing at the target craft determined by the AME system serve to provide spatial coordinate information of the target vehicle's location.

As noted earlier, the present system is capable of simultaneously tracking a plurality of target craft, only two being given herein as an example of the present system capabilities. This parallel tracking function is provided by a sequencing unit which serves to alternately modulate a pair of extra, different signal frequencies along with the normal range signals on the ground-transmitted DME carrier signal. Then, the transponder carried by one of the target vehicles responds to one of the extra modulated signals to effectively energize its transmitter and hence retransmit the received DME range signals back to the ground. The received signal is demodulated, and the resulting series of range signals are passed into a first slant range servo readout which serves only to hold the slant range information of this first target vehicle position. Similarly, the pair of direction cosines measured to this first transponder by the AME system from receipt of this transponder carrier signal are applied to a pair of AME servo readout units corresponding to this first target vehicle.

Then, when the other extra signal is modulated by the sequencing unit on the DME carrier signal, the first transponder is de-energized, and the transponder carried in the second target vehicle energizes its trasponder to thereby return the received DME range signals back to ground. As before, the sequencing unit routes the range signals demodulated by the receiver to a slant range servo readout corresponding to this second vehicle, and, at that time, the AME direction cosine signals derived from the AME system are routed to a respective pair of direction cosine readout units which hold the second target vehicle direction cosine information.

In this way, then, a single ground station is time-shared between two transponders and two corresponding sets of servo readout units, with the result that the present position of both target vehicles may be computed at any time based on their respective slant range and pair of direction cosine unit readings found in their associated sets of servo readout units.

It is, accordingly, the principal object of the present invention to provide an electronic system capable of deriving spatial coordinate position information of a series of target vehicles by sequentially employing a slant-range measuring system, in conjunction with a pair of direction cosine measuring systems, to derive slant range and direction cosine information of the series of target vehicles.

Another object of the present invention is to provide a combination of slant range and direction vector measuring equipment which is capable of simultaneously determining spatial coordinate information of a plurality of airborne target vehicles.

Still another object of the present invention is to provide a tracking system capable of producing simultaneous tracking information of a plurality of target vehicles by serially interrogating transponders carried by the target craft and determining slant range and direction vector information of each craft's position by means of the transponder's interrogation.

A further object of the present invention is to provide a tracking system capable of producing simultaneous tracking information of a number of target vehicles by sequentially measuring the slant range to the target vehicles by a DME system, and simultaneously therewith, determining a direction vector to each of the target craft by a pair of crossed-baseline AME systems based on the carrier signals received by the DME system.

A still further object of the present invention is to provide a composite DME and AME system capable of providing simultaneous tracking information of a plurality of airborne target craft by employing the DME portion to sequentially interrogate the transponders carried by the target craft and employing the AME portion to determine direction vectors to the target craft based on the sequenced transponder return signals.

Another object of the present invention is to provide a DME system which is sequenced to provide separate slant range measurements to a plurality of airborne target vehicles, and a pair of AME systems which respond to the signals employed by the DME system to determine a pair of direction cosines to each of the target vehicles, the slant range and pair of direction cosines thus determined to each target vehicle providing spatial coordinate information of its position.

Other objects, features and attendant advantages of the present invention will become more apparent to those skilled in the art as the following disclosure is set forth, including a detailed description of a preferred embodiment of the invention as illustrated in the accompanying sheets of drawings, in which:

FIGURE 1 is a block diagrammatic representation of the basic system according to the present invention;

FIGURE 2 is a block diagrammatic representation of the DME unit of the present system;

FIGURE 3 is a block diagrammatic representation of a typical transponder;

Figure 4:
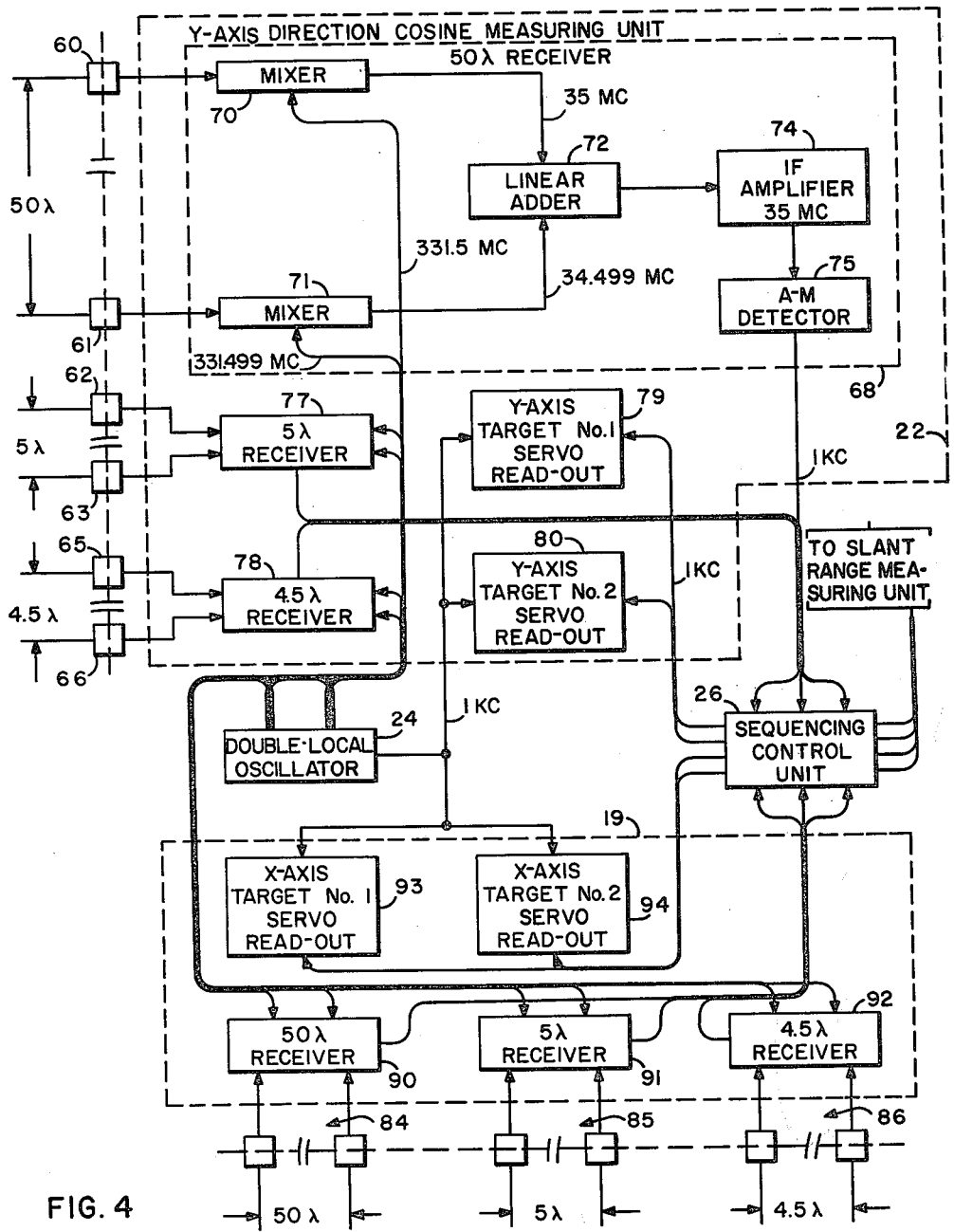
FIGURE 4 is a block diagrammatic representation of the two AME units of the present system.

Referring now to the drawings, wherein the same elements are given identical numerical designations, there is illustrated in FIGURE 1 the basic block functional layout of the system according to the present invention. A slant-range measuring unit 10 produces an output signal which is transmitted by an antenna 11 and received by a pair of transponders located in a pair of target vehicles 12 and 14, respectively, the transponders being indicated schematically in the figure by corresponding circles. The transponders alternately retransmit the received signal, and the retransmitted signals, in turn, are received on a ground-based antenna 16 coupled to slant-range measuring unit 10. The pair of transponder-transmitted signals are also received on a crossed-baseline antenna system, indicated generally at 17, which includes, as schematically indicated, an x-baseline antenna pattern 18 and a y-baseline antenna pattern 20. The x- and y-baseline antenna patterns are coupled to an x-axis direction cosine measuring unit 19 and a y-axis direction cosine measuring unit 22, respectively. A double local oscillator 24 furnishes output signals to each of the respective x- and y-axis measuring units 19 and 22. Finally, a sequencing control unit 26 is in input-output signal communication with all of the measuring units 10, 19 and 22.

Since the detailed operation of the various units illustrated in FIGURE 1 are set forth in greater detail later, only their broad operational relationship need be set forth in connection with this figure. The DME portion of the present system, that is, slant range unit 10, which is shown in more detail in the following FIGURE 2, produces a carrier signal modulated by a series of range signals, which is transmitted by antenna 11 and received by both transponders in aircrafts 12 and 14. Two sequencing signals of different frequencies, produced by the sequencing control unit, are alternately modulated on this carrier signal, and the transponders are arranged to respond alternately to these two added signal frequencies. In particular, one transponder responds to one of these injected signals by effectively operating its transmitter and returning the received ground signal, while the other transponder responds to this same added frequency by cutting off its transmitter and hence not returning the received signal. Similarly, the operation of the two transponders is reversed upon receipt of the other sequencing signal, that is, the first transponder does not retransmit the ground-received signal, while the second transponder does retransmit the ground-received signal. Accordingly, the two transponders will alternately transmit the ground signal in accordance with the particular sequencing signal modulated on the received carrier signal.

The transponder return signals are received on antenna 16 and passed back into slant-range measuring unit 10, where they are demodulated, and the resulting range data signals are alternately passed into a pair of servo readout units, one for each transponder, in accordance with which transponder is then transmitting. Accordingly, two slant range measurements are alternately made of the two target craft positions.

The AME portion of the present system, including the x-axis and the y-axis direction cosine measuring units, operate on the carrier signal returned by the pair of DME transponders, as received on their respective antenna baselines. In particular, the carrier signals, as alternately transmitted by the transponders carried in target vehicles 12 and 14, are alternately received on the antennas constituting x-axis antenna baseline 20, and passed from there into y-axis direction-cosine measuring unit 22, where a pair of direction cosines measured from the y-baseline to the two respective targets will be determined and presented as output data. In the same way, the same alternately-appearing pair of transponder carrier signals are received on the antenna pairs in the x-antenna baseline 18, and passed from there to the x-axis direction-cosine measuring unit, where a pair of respective direction cosines to the two respective target vehicles, as measured from this baseline, will be determined. The operation of the y-axis and x-axis direction cosine units is set forth in more detail in the following FIGURE 4 and described in connection therewith.

The DME or slant-range measuring unit 10 of FIGURE 1 is shown in more detail in FIGURE 2. The series of range signals produced by a range signal generator 30 are applied to one input terminal of a linear mixer 31, to the reference range signal input terminals of a target #1 readout 32, and to a target #2 readout 33. Sequencing control unit 26 supplies the transponder sequencing signals to the other input terminal of linear mixer 31, whose output signal, in turn, is applied to the input terminal of a data transmitter 35. The output signal of data transmitter 35 is applied to transmitting antenna 11 for transmission to the two target vehicles.

The DME receiving antenna 16 is coupled to the input terminal of a receiver unit 36, whose output signal, comprising the data range signals, is applied to sequencing control unit 26. Finally, the data range signals are alternately applied, by sequencing control unit 26, to the other input terminals of target #1 and target #2 units 32 and 33, respectively.

In operation, range signal generator 30 produces a series of range signals, as noted in the prior-mentioned application for patent, No. 737,446, which may, for example, comprise frequencies of 491.76 kc., 61.47 kc., 7.68 kc., 1.921 kc., and .1921 kc. Linear mixer 31 serves to mix a pair of alternately-appearing 100-kc. and 115-kc.

frequency transponder select signals, as supplied by sequencing control unit 26, with these prior-mixed range signals. The series of range signals and the particular transponder select signal will be phase modulated on a carrier signal within transmitter 35, the technique not being specifically shown. Finally, the resulting modulated carrier signal will be amplified and applied to antenna 11 for transmission to the two transponders.

As described in detail later, the particular transponder corresponding to the transmitted transponder select frequency returns the ground-transmitted signal, which is received on antenna 16 and passed into receiver 36. Receiver 36 demodulates the particular transponder signal being received to thereby furnish the same series of reference range signals as previously generated by generator 30, but phase delayed from the series of reference signals by amounts corresponding to the slant range distance of the responding transponder from the ground station. This series of data range signals is applied to a sequencing control unit, which, as described in detail later, acts to route them alternately to readouts 32 and 33 in accordance with the particular target then transmitting.

Although the detailed circuitry and mode of operation of a typical DME servo target readout unit is set forth in the noted co-pending application for patent, Serial No. 737,446, a brief description of its operation is herewith set forth, particularly in order indicate the means by which the five range signals, given by way of example above, can be combined to yield a single over-all unambiguous slant-range reading to the pair of target vehicles.

In particular, the readout unit includes five channels, one for each range signal. Each channel takes its corresponding delayed range signal, received from the transponder through the sequencing control unit, and the original range reference signal and effectively compares their respective phases across a resolver whose shaft displacement, at a point of zero resolver output signal, will represent the phase displacement between its two input signals. At all other resolver shaft positions an output resolver signal will be produced, corresponding to the direction and amount of its shaft displacement away from a null position representing, as stated above, the phase displacement between the two range signals applied to the resolver.

All of the channel resolver shafts are serially coupled to a servo-motor-driven gear train at step-down ratio points corresponding to their respective frequency ratios. Now, the servo motor will, at any time, be energized by one, and only one, of the channel resolver error signals, the energization being such as to drive the gear train in a direction to reduce the resolver output signal of the particular channel having control to a zero value. This channel selection is accomplished by continually sensing the resolver error in each channel and switching the lowest range frequency channel, that is, the channel having the greatest ambiguity-resolving ability, into controlling the servo motor whenever its resolver error signal reaches a predetermined magnitude. In this way, slant range ambiguities are continuously resolved, and a single, composite, highly accurate readout achieved at all times, based on the combined readings of all of the servo readout channels.

It should be noted that the operation described above occurs only when the data signal is applied by the sequencing control unit to the servo, as it will be during each interval its corresponding transponder is transmitting. During the other intervals, when no data signals are applied to it, the servo action is effectively disabled, since both data and reference signals are simultaneously required for producing a resolver error signal as used for servoing purposes. The sampling or sequencing rate employed is sufficiently high that no appreciable servo data lags occur, by reason of this intermittent application of data signals, to the various servo readout units.

The detailed layout of a typical transponder is shown in FIGURE 3. The ground-transmitted signals are received on an antenna 38 and applied through a duplexer 39 to the input terminal of an R-F amplifier 40. The output signal from amplifier 40 is applied to one input terminal of a mixer 42, whose output signal, in turn, is amplified by an I-F amplifier 44 and applied to a discriminator 45. The output signal of discriminator 45 is applied both to a filter 46 and to a compensating amplifier 47. The output signal from compensating amplifier 47 is applied to one input terminal of a phase modulator 48, which, in turn, receives the output signal of a crystal-controlled oscillator 49 on its other input terminal. The output signal of modulator 48 is amplified by an amplifier 50, frequency multiplied by a frequency quadrupler or ($\times 4$) frequency multiplier 52, and applied to the input terminal of another amplifier 53.

Returning now to filter 46, this filter will have a 100-kc. passband frequency in one of the transponders and a 115-kc. passband frequency in the other transponder. Its output signal will be applied to the input terminals of a keying amplifier 55 and a keying amplifier 56. The output signal of amplifier 55 is applied to the control terminal of a frequency doubler 57, while the output signal of keying amplifier 56 is applied to the control terminal of an amplifier and frequency doubler 58. The output signal of amplifier 53 is applied to the input terminals of both frequency doubler 57 and final amplifier 58. The output signals of frequency doubler 57 and amplifier and frequency doubler 58 are both applied to the other input terminal of mixer 42. Finally, the output signal of final amplifier 58 is coupled through duplexer 39 to antenna 38 for radiation to the ground.

In considering the operation of the transponder, assume, first of all, that mixer 42 is receiving an input signal from either amplifier 58 or doubler 57, one or the other always producing an output signal, as described later, with the result that the input signal received from antenna 38 is amplified by I-F amplifier 44 and demodulated by discriminator 45. Filter 46 will be tuned to 100 kc. in one transponder and to 115 kc. in the other transponder, as noted previously. Assume, for the purposes of discussion, that it is tuned to 100 kc. and that the 100-kc. sequencing signal appears, for the moment, in the input signal. Filter 46 will, accordingly, pass an output signal to both of keying amplifiers 55 and 56.

Keying amplifier 56 is arranged to open or turn on its associated frequency doubler and amplifier 58 in response to such an input signal. Electronically, this may be done by rectifying the filter-passed signal to form a negative D.-C. level and applying the D.-C. level to the grid of a normally conducting triode tube whose plate, in turn, is coupled to the screen grid of the amplifier in amplifier 58. The triode will be driven to cut off, owing to the negative signal applied to its grid, with its plate being raised to the B+ potential. Accordingly, the screen grid of the amplifier will be raised to a conducting potential, with amplifier 58 amplifying normally and passing an amplified signal to the antenna for radiation to the ground. Also, the output signal from amplifier 58 will be applied back to mixer 42 and hence produce the receiver operation, as originally assumed.

Keying amplifier 55 and frequency doubler 57 are arranged such that frequency doubler 57 will be energized to its "on" condition in the absence of a signal passed by filter 46. A signal will, accordingly, be passed back from the output terminal of amplifier 53 to mixer 42 to thereby maintain the receiver section of the transponder in an operative status even though it is not receiving its specified transponder input signal. Accordingly, during the next sequenced cycle of transmission from the ground, this receiver portion will be active and hence pass the 100-kc. signal to gate the transponder return "on." Upon the next appearance of the 100-kc. signal, keying amplifier 55 will act to cut off frequency doubler 57, with the input signal to mixer 42 coming only from the final amplifier 58.

The operation defined for keying amplifier 55 and frequency doubler 57 may, in practice, be obtained in any one of a number of ways. For example, keying amplifier 55 may be normally biased to cut off, and its resulting high plate potential, in being applied to the screen grid of an amplifier tube in doubler 57, act to maintain the tube in conductive status. Then, by rectifying positively the 100-kc. signal passed by filter 46, and employing it to raise the keying amplifier above cut-off, the screen grid potential in frequency doubler 57 would be accordingly lowered and its amplifying halted.

It is thus seen that keying amplifiers 55 and 56 act with a push-pull type of action, since, with no 100-kc. signal input, the receiver section will be maintained operative by the amplifier 55 signal to mixer 42, and with an input 100-kc. signal, mixer 42 is supplied with an energizing signal by output amplifier 58. Also, during the presence of the 100-kc. signal only, since the final output amplifier 58 is energized, its output signal is transmitted from the transponder to the ground station.

Consider now the operation of the remaining portion of the transponder. The output signal of discriminator 45 will include the series of range signals modulated by the ground station on the DME carrier signal. Compensating amplifier 47, similar to the one noted in the transponder section of the prior-noted application for patent, Serial No. 737,446, is sharply tuned at each of the range signal frequencies, thereby eliminating any noise existing in the region between the range signals. The passed range signals are then modulated by phase modulator 48 on the output signal produced by crystal-controlled oscillator 49 (which may, by way of example, be 45.8125 mc. in frequency). This signal, after amplification in amplifier 50, is multiplied four times in frequency by frequency multiplier 52 to a frequency of 183.25 mc. This frequency is again doubled by the final amplifier and frequency doubler 58 to produce the transponder output signal of 366.5 mc., which is coupled through duplexer 39 to antenna 38 for radiation to the ground station.

As was thoroughly discussed in the prior-noted application for patent, the degenerative feedback signal from the final amplifier 58 to mixer 42 serves to minimize any range signal phase shifts which may have been incurred in passing through the transponder circuitry. This is required, since any phase shifts in the range signals in passing through the transponder will be reflected at the ground as slant range distance errors.

Additional details of the $y$- and $x$-axis direction cosine measuring units and the crossed-baseline antenna system 17, shown earlier in FIGURE 1, are set forth in detail in FIGURE 4. First of all, double local oscillator 24 produces a 1-kc. reference output signal and a pair of R-F output signals having respective frequencies of 331.5 mc. and 331.499 mc. The two R-F signals differ in frequency and phase by an amount which corresponds exactly to the 1-kc. reference signal. The $y$-baseline 20 includes three separate antenna pairs. A first pair of antennas 60 and 61 are positioned exactly 50λ apart, where λ is the wavelength of the carrier signal transmitted by the transponder. In the same way, a second antenna pair comprising antennas 62 and 63 are positioned along the baseline exactly 5λ apart, while a final antenna pair comprising antennas 65 and 66 are positioned exactly 4.5λ apart.

Antennas 60 and 61 are coupled to a 50λ receiver 68, and, in particular, into mixers 70 and 71, respectively, within the receiver. The pair of 331.5-mc. and 331.499-mc. frequency R-F signals produced by local oscillator 24 are applied to the other input terminals of mixers 70 and 71, respectively. The output signals of mixers 70 and 71 are applied to the two input terminals of a linear adder 72, whose output signal, in turn, is applied to the input terminal of an I-F amplifier 74. The output terminal of amplifier 74 is, in turn, coupled to the input terminal of an A-M detector 75, whose output signal, in turn, is applied to sequencing control unit 26.

Antennas 62 and 63 are coupled to a 5λ receiver 77, similar in all respects to the 50λ receiver, which likewise receives the two output R-F signals from local oscillator 24 and applies a single output signal to sequencing control unit 26. In the same way, a 4.5λ receiver 78 is coupled to the 4.5λ antennas 65 and 66 and to double local oscillator 24 and produces an output signal which is applied to sequencing control unit 26. Finally, this $y$-axis direction cosine measuring unit 22 includes a $y$-axis target #1 servo readout 79 and a $y$-axis target #2 servo readout 80. The 1-kc. reference signal produced by oscillator 24 is applied to each of readouts 79 and 80, and respective 1-kc. data signals from sequencing control unit 26 are also applied to these servo readouts.

The $x$-axis direction cosine measuring unit 19 is similar to the $y$-axis unit 22 and is associated with a pair of 50λ antennas indicated at 84, a pair of 5λ antennas indicated at 85, and a pair of 4.5λ antennas indicated at 86. It includes three receivers, a 50λ receiver 90 coupled to the 50λ antenna pair 84, a 5λ receiver 91 coupled to the 5λ antenna pair 85, and a final 4.5λ receiver 92 coupled to the 4.5λ antenna pair 86. The separate R-F signals produced by double local oscillator 24 are applied to each of receivers 90, 91 and 92. Also, the output signal from each receiver is applied to sequencing control unit 26. Finally, the $x$-axis measuring unit includes an $x$-axis target #1 servo readout 93 and an $x$-axis target #2 servo readout 94. The reference signal from double local oscillator 24 and respective data signals from sequencing control unit 26 are applied to both of these readouts.

In considering the operation of 50λ receiver 68, it will be appreciated that the two paths taken by the transponder-transmitted signal in traveling to antennas 60 and 61, will generally be different in length. Accordingly, a phase difference will exist between the signals received on antennas 60 and 61, and the magnitude of this phase difference will be determined by the direction cosine of the target vehicle measured from the $y$-antenna baseline.

As noted in the previous application for patent, Serial Number 754,099, the direction cosine indicated by the phase difference between these 50λ antenna pairs will be ambiguous, since an indeterminate number of complete cycles of phase difference can exist in the two path lengths to the two antennas. As was also described in detail in this application for patent, this ambiguity is resolved in the servo readout by employing the 5λ receiver output signals to partially resolve the signal ambiguities in this 50λ receiver direction cosine, and then employing the difference between the 5λ and 4.5λ signals, corresponding, in turn, to an unambiguous effective λ/2 signal to resolve the 5λ ambiguities. In this way, then, a final, single, unambiguous output reading of the direction cosine to its corresponding target is obtained in each servo readout.

The 50λ receiver 68 produces a single 1-kc. signal whose phase relationship with the 1-kc. reference signal produced by oscillator 24 corresponds to the phase difference between the pair of carrier signals received on antennas 60 and 61. This is accomplished by mixing the two received carrier signals with the two respective R-F output signals produced by double local oscillator 24. Accordingly, linear adder 72 receives a 35-mc. signal from mixer 70 and a 34.499-mc. signal from mixer 71. The addition of these two signals in adder 72 produces a 35-mc. signal which is A-M modulated at 1-kc., the difference in frequency between the two applied R-F signals. I-F amplifier 74 will amplify this A-M modulated signal, and A-M detector 75 detects the envelope of this modulated signal to produce the 1-kc. data output signal. The phase difference between this 1-kc. data signal and the reference 1-kc. signal produced by oscillator 24 represents the direction cosine of the particular target vehicle then transmitting the signal received on the 50λ antenna pair. The remaining two receivers 77 and 78 operate similarly to receiver 68, and their resulting 1-kc. data signals will likewise be applied to sequencing control unit 26.

The 1-kc. data signals will be continuously produced by the receivers as the pair of transponders alternately transmit their respective carrier signals. Sequencing control unit 26 acts, therefore, in accordance with its detailed description of operation, as given in connection with FIGURE 5, to alternately gate the received 1-kc. data signal from the various y-axis receivers from one target servo readout to the other in accordance with the particular transponder then in transmitting status. This, as described, is based on whether the sequencing control unit is modulating the 100-kc. or the 115-kc. keying signal on the ground-transmitted carrier signal, the two signals, in turn, acting to control the two transponder responses. Since the 1-kc. reference signal is continuously applied to the y-axis servo readouts 79 and 80, the alternate application of the 1-kc. data signal to the two servo readouts enables the determination of the direction cosine to each of the two target vehicles from the y-antenna baseline.

The description of operation just presented for the y-axis direction cosine measuring unit applies equally to the operation of the x-axis direction cosine measuring unit, since the two units are similar. Hence, the two R-F signals from oscillator 24 are applied to each of the receivers within unit 19, and the 1-kc. data signal, derived from each receiver, is applied to sequencing control unit 26. Unit 26 again serves to sequentially route the receiver data signals to the appropriate x-axis servo readout units based on the sequencing signal being modulated at any instant on the carrier signal. Accordingly, the two x-axis servo readouts will present direction cosine information based on the position of their respective target vehicles from the x-baseline.

Figure 5:
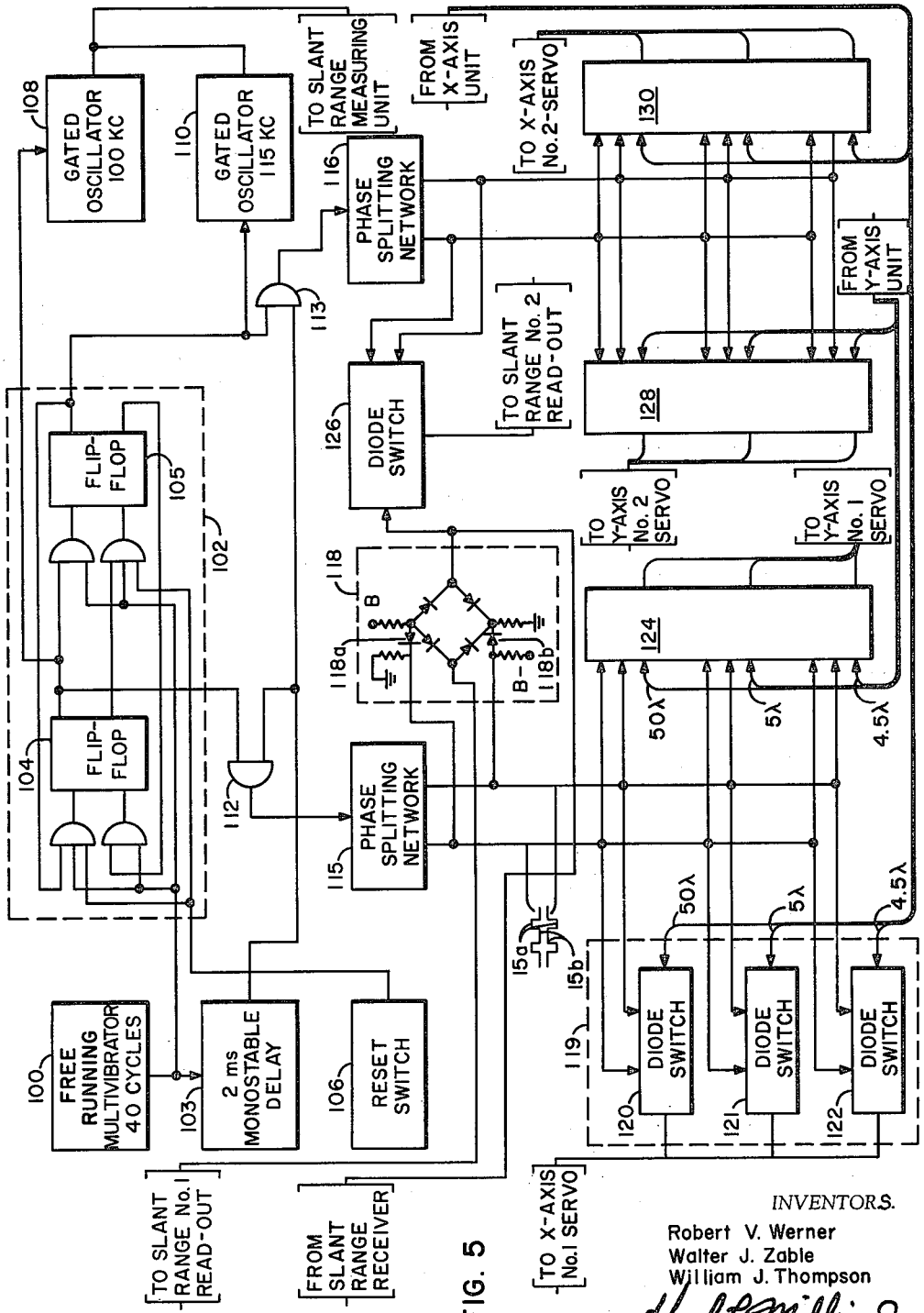
FIGURE 5 is a block diagrammatic showing of the sequencing control unit according to the present invention.

In FIGURE 5 is shown sequencing control unit 26, earlier shown in block form in FIGURES 1, 2 and 4. The output signal of a 40-c.p.s. free-running multivibrator 100 is applied to one input terminal of a selection register 102 and to the input terminal of a 2-ms. monostable delay circuit 103. Selection register 102 includes first and second flip-flops 104 and 105 connected as a stepping register, with the output signal of multivibrator 100 being applied to one input terminal of each of a pair of "and" gating circuits, in turn, connected to the set and reset input terminals, respectively, of flip-flop 104. The pair of output signals of flip-flop 104 are applied to another respective pair of "and" gating circuits, in turn connected to the set and reset terminals, respectively, of flip-flop 105.

The output signal of multivibrator 100 is also connected to another input terminal of each of the input "and" gates associated with flip-flop 105. The set output conductor of flip-flop 105 is connected to another input terminal of the set "and" circuit associated with flip-flop 104, while the reset output terminal of flip-flop 105 is connected to the other input terminal of the reset input "and" gate of flip-flop 104. The output conductor of a reset switch 106 is connected to the set and reset input gates associated with the flip-flops 104 and 105, respectively.

The set output signal of flip-flop 104 is connected to the input terminal of a gated 100-kc. oscillator 108, while the set output terminal of flip-flop 105 is coupled to the input terminal of a gated 115-kc. oscillator 110. The output signals of the two oscillators 108 and 110 are applied, as indicated, to the slant-range measuring unit shown earlier in FIGURE 2.

The set output signal of flip-flop 104 and the output signal of monostable delay circuit 103 are coupled to the two respective input terminals of an "and" gate 112, whose output terminal, in turn, is coupled to the input terminal of a phase-splitting network 115. In the same way, the output signals of flip-flop 105 and monostable delay circuit 103 are applied to the two input terminals of another "and" gating circuit 113, whose output signal is applied to a phase-splitting network 116. The pair of output signals from phase-splitting network 115 are applied to the two control terminals of a diode switch 118, which also receives, on its input conductor, the output signal from the slant range receiver 36, earlier shown in FIGURE 2. The output signal of switch 118 goes to the slant range target #1 readout, as previously shown in FIGURE 2.

In the same way, the output signals from phase-splitting network 115 are connected to the control input terminals of three diode switches 120, 121 and 122, within a diode switch unit 119. Diode switches 120, 121 and 122, in turn, receive the data signals from the 50λ, 5λ and 4.5λ receivers, respectively, of the x-axis direction cosine measuring unit previously shown in FIGURE 4. The respective output signals from these diode switches are, in turn, connected to the x-axis target #1 servo readout. In the same way, the pair of signals from phase-splitting network 115 are applied to another diode switch unit 124, similar in all respects to switch unit 119. The y-axis direction cosine measuring unit signals are applied to switch unit 124, and output signals from unit 124 are applied to the y-axis target #1 servo readout, previously shown at 79 in FIGURE 4.

The pair of output signals from phase-splitting network 116 are applied to the two control input terminals of another diode switch 126. The slant range receiver signals are applied to the input terminal of switch 126, and the output signal passed by the switch is indicated as going to the slant range target #2 readout, shown previously in FIGURE 2 at 33. Another pair of switching units 128 and 130 are indicated in block form and may be identical in detail to switching unit 119. The pair of output signals produced by phase-splitting network 116 are applied to each of networks 128 and 130, as are the respective y-axis and x-axis direction cosine measuring unit output signals. The three output signals from unit 128 are applied to the y-axis target #2 servo readout, as indicated previously in FIGURE 4 at 80. Finally, the three output signals from switch unit 130 are coupled to the x-axis target #2 servo readout, indicated previously at 94 in FIGURE 4.

The flip-flops 104 and 105 may be represented by any of the numerous types of flip-flops known and employed in, for example, the digital computing art. Assume, for the purposes of describing the operation of this sequencing unit, that each of these flip-flops is triggered by a negative-going signal applied to its set or reset input terminal, as the case may be, and that its "on" or "1" output condition is represented by its set output terminal being at a relatively high voltage level. Also assume that reset switch 106 produces a normal high voltage output level.

Now, when flip-flops 104 and 105 are "on" and "off," respectively, the reset output signal from flip-flop 105 will be at its high voltage level. Then, at the end of the next multivibrator 100 output signal cycle, as it goes from its high to low voltage level, a triggering signal will be applied through this input reset "and" circuit to thereby trigger flip-flop 104 to its "off" or "0" conduction state. Simultaneously with this occurrence, the "and" circuit associated with the set input terminal of flip-flop 105 produces a negative-going signal, since its two input terminals are coupled to multivibrator 100 and the set output terminal of flip-flop 104, respectively. Flip-flop 105 is thereby triggered to its "1" or "on" state. Thus, the end of the described multivibrator 100 cycle caused the "1" in flip-flop 105 to be effectively transferred into flip-flop 104, and the "0" in flip-flop 104 to be transferred into flip-flop 105.

In the same way, at the end of the next cycle in the multivibrator 100 output signal, the "on" or "1" state of flip-flop 105 will be transferred back to flip-flop 104 owing to the connection made between its set output terminal and the "and" gate associated with the set input terminal of flip-flop 104. Accordingly, the "on" or "1" state will be continuously transferred between flip-flops 104 and 105, one transfer being made each cycle in the output signal of the multivibrator. Since multivibrator 100 has a free-running frequency of 40 cycles per second, the transfer will be made at the 40 c.p.s. rate, with the result that each of flip-flops 104 and 105 will be "on" 20 times a second.

Gated oscillators 108 and 110 may be of a similar variety and, by way of example, each may comprise a pentode tube having a continuously-running Pierce oscillator circuit, producing its designated frequency, connected between its screen, grid, and cathode electrodes. Then, if the set output terminal of flip-flop 104 is connected to the suppressor grid in the oscillator 108 pentode, each time flip-flop 104 is at its "on" state the oscillation produced in the screen and grid circuits is passed as an amplified signal to its plate circuit, and thereafter appied to the slant-range measuring unit as a 100-kc. signal.

In the same way, the 115-kc. signal produced by oscillator 110 is transmitted to the slant-range measuring unit each cycle flip-flop 105 is at its "on" state. Hence, oscillators 108 and 110 are alternately energized in accordance with the "on" state of their respective flip-flops, and the resulting 100 kc. and 115-kc. signals are transmitted to the slant-range measuring unit for modulation, as before noted, on the carrier signal transmitted by the slant-range measuring unit of the present system.

Although oscillators 108 and 110 are triggered off and on alternately without any appreciable time delay between their relative off-on times, their signals, when modulated on the carrier and returned by the transponder, experience a delay whose magnitude is a function of the transponder slant range. Hence, for example, at the instant oscillator 108 is turned off and oscillator 110 is turned on, the demodulated range signals appearing in the receiver unit are still coming from the transponder in vehicle #1 and will continue to come until all signals then in the process of transmission at the instant of oscillator switching appear at the ground antenna. Accordingly, it is necessary to delay the passage of the range and direction cosine signals to their respective readouts for a length of time after each oscillator switching operation, in order to permit the signal transmitted by the other transponder to complete its passage.

This delay function is accomplished by the 2-millisecond monostable delay circuit 103. This circuit normally produces a high output voltage level and is triggered by each negative-going portion in the multivibrator 100 output signal to produce a low voltage level lasting, by way of example, for 2 milliseconds. This low level, in turn, when applied to "and" circuits 112 and 113, inhibits the passage of the high voltage level from their associated flip-flops to phase-splitting networks 115 and 116, respectively. Accordingly, although the output signal of each flip-flop is approximately a square wave, the high voltage level applied to the phase-splitting network will be 2 milliseconds shorter than the low voltage level. Phase-splitting network 115, in turn, produces a pair of complementary output signals on its two pairs of output lines, as indicated by the signal waveforms 115a and 115b, based on its input signal from "and" circuit 112.

Consider now the operation of diode switch 118 in response to the input complementary signal levels from phase-splitting network 115. During the interval level 115b, series diodes 118a and 118b conduct current which flows between their associated B+ terminals and ground, with the result that the bridge-connected diodes are back-biased or non-conducting and a high impedance is offered to the linearly mixed range signals appearing from the slant range receiver. Accordingly, during the 115b intervals, corresponding to the "off" time of flip-flop 104, the receiver range signals are blocked from the target #1 readout.

On the other hand, during the 115a intervals, corresponding to the "on" time of flip-flop 104, series diodes 118a and 118b are back-biased, and normal current conduction takes place between the B+ bridge terminal and ground through the bridge diodes and resistors. During this conduction interval, the receiver line signals are passed to the slant range target #1 readout, and its slant range reading is accordingly brought up to date, based on its vehicle's then-existing slant range value.

As noted earlier, all of the diode switches in switch units 119 and 124 are identical to switch 118, and their operations are similar thereto. Hence, during the "on" time of flip-flop 104, all of the switches in these two units will be opened, the direction cosine signals from the x-axis direction cosine measuring unit will be passed by switch unit 119 to the x-axis target #1 servo unit, and the direction cosine signals coming from the y-axis direction cosine unit will be passed by switch unit 124 to the y-axis target #1 servo unit.

Phase-splitting network 116 produces a pair of output signals, similar to those produced by network 115 but delayed 180° in phase therefrom, corresponding to the difference in phase between the flip-flop 104 and flip-flop 105 output signals. Hence, when network 116 produces complementary signal levels similar to intervals 115a in the illustrated network 115 output signals, diode switch 126 and all of the individual diode switches in switch units 128 and 130 will be opened, with the result that the range data signals, the x-axis direction cosine signals, and the y-axis direction cosine signals will be passed to the target #2 slant range readout, the x-axis target #2 servo readout, and the y-axis target #2 servo readout, respectively.

In summary, then, the sequencing circuit acts to alternately gate the two oscillators 108 and 110 on, whose signals are then alternately modulated on the carrier signal and serve to alternately key the two transponder transmitters on, as described. Then, alternate return signals from the two transponders will appear on the ground, and these, in turn, will be fed into separate slant range x- and y-axis servo units in accordance with the operation of selection register 102. Hence, the separate target servo readouts will always receive distance and direction cosine information corresponding to their particular targets, and the continuous spatial coordinate position information of the two target craft can then be computed, by additional computational elements, not specifically shown, from the servo readout information.

Finally, reset switch 106 serves, when manually energized, to simultaneously set flip-flop 104 and zero flip-flop 105, since it is connected to the "and" circuits connected to the set and reset input terminals, respectively, of these two flip-flops. This function is required when the equipment is initially energized in order that alternate conduction states of flip-flops 104 and 105, as required, may be initially provided.

The system thus described may be readily extended to provide additional airborne target tracking capabilities, that is, more than the two specifically shown, without involving invention. Such an extension would require another DME target readout, similar to those shown at 32 and 33 in FIGURE 2, for each additional target. In the same way, additional y-axis and x-axis servo readouts, corresponding to y-axis readouts 79 and 80 and x-axis readouts 93 and 94, as shown in FIGURE 4, would be required for each additional target.

In addition, obvious extensions of the sequencing control unit, shown in FIGURE 5, would be required to operate the system. For example, an additional flip-flop and an associated gated oscillator, similar to oscillators 108 and 110, would be required in the selection register for each additional target. Additional phase splitting networks would be associated with each of the additional flip-flops in the sequencing control unit, and extra appropriate diode switches would be required to sequence the x and y direction cosine information and DME information to the additional servo units, as described above.

The waveforms applied to the phase splitting networks would differ from the waveforms specifically shown in FIGURE 5 in that the high voltage level would remain on for only one-third of the time if three flip-flops, corresponding to three targets, were employed, or one-fourth of the time for four flip-flops in a four-target case, etc. This is true since the selection register is, as noted earlier, operated essentially as a stepping register, where only one flip-flop is "on" at a time and this "on" state is cycled around the register at the basic sampling frequency.

It will, of course, be appreciated that numerous modifications and changes may be incorporated in the particular arrangement of circuits illustrated and still accomplish the over-all function set forth without involving invention. It is also apparent that each of the circuits shown in block diagrammatic form may take any one of the many well-known recognized forms as known in the art and described in numerous handbooks, technical books and periodicals without the employment of invention.

It will be appreciated, of course, by those skilled in the art, that the foregoing description relates only to a detailed preferred embodiment of the invention whose spirit and scope is set forth in the appended claim.

What is claimed is:

An electronic system for producing position information of a series of target vehicles carrying a series of transponder means, respectively, said series of transponder means being responsive to the receipt of a carrier signal modulated by a series of keying signals, respectively, said series of keying signals being of different frequencies, and additionally modulated by a plurality of ranging signals, for returning a carrier signal modulated by said plurality of ranging signals, said system comprising: transmitter means normally transmitting a carrier signal modulated by a plurality of ranging signals; first and second receiver means responsive to a carrier signal received from said series of transponder means for producing signal information representing first and second direction cosines, respectively, to said series of transponders, respectively; third receiver means responsive to the signal received from said series of transponder means for producing signal information representing the slant ranges to said series of transponders, respectively; first and second series of readout means, each of said first and second series of readout means corresponding to said series of target vehicles, respectively, each of the readout means in the first and second series being responsive to applied signal information as from said first and second receiver means corresponding to its transponder for producing first and second direction cosine information, respectively; a third series of readout means corresponding to said series of target vehicles, respectively, each of said third series of readout means being responsive to the receipt of a plurality of ranging signals from said third receiver means and corresponding to its associated target vehicle for producing slant range information thereto; sequencing means including binary digital stepping means having a series of flip-flop stages corresponding to said series of target vehicles, respectively, one of said series of flip-flop stages always being at a first conduction state, the remaining stages being at a second conduction state, said stepping means being responsive to periodically applied input signals for stepping said first conduction state down and around said series of stages, a series of signal producing means producing said series of keying signals, respectively, a series of gating means corresponding to said series of signal producing means, each of said gating means being responsive to an applied first conduction state for applying the output signal of its corresponding signal producing means as a modulation signal in the carrier signal transmitted by said transmitter means, means for coupling each flip-flop stage in said stepping means to its associated gating means, a series of diode switching means corresponding to the series of flip-flop stages, respectively, in said stepping means, means for coupling said first, second and third receiver means and said first, second and third readout means of each of said series of diode switching means, each of said diode switches being responsive when energized for applying the output signal information produced by said first, second and third receiver means to said first, second and third readout means, respectively, each of said series of diode switching means being energized by the application of a pair of complementary first signals, and a series of phase splitting network means coupled between said series of flip-flop stages and said series of diode switching means, respectively, each of said phase splitting means being responsive to the first conduction state of its corresponding flip-flop stage for energizing its associated diode switching means; signal generating means for generating a series of periodic signals; and means for applying the periodic signals produced by said signal generating means to the stepping means in said sequencing means whereby said first conduction state is stepped down and around said stepping means, the series of signals produced by said series of signal producing means are sequentially modulated on said carrier signal; and the signal information from said first, second and third receiver means is sequentially applied to said first, second, and third readout means, respectively.

References Cited in the file of this patent

UNITED STATES PATENTS

| 2,736,892 | Moran | Feb. 28, 1956 |
| 2,857,592 | Hoffman | Oct. 21, 1958 |

OTHER REFERENCES

"Multi-Object Phase Tracking and Ranging System (MOPTAR)," Armed Services Technical Information Agency Document No. AD 110,862, prepared by Cubic Corporation. Dated August 16, 1956, and received in the Patent Office Scientific Library on April 1, 1959.